(12) United States Patent
Kurosaki

(10) Patent No.: US 12,152,662 B2
(45) Date of Patent: Nov. 26, 2024

(54) DIFFERENTIAL DEVICE

(71) Applicant: TOYOTA JIDOSHA KABUSHIKI KAISHA, Toyota (JP)

(72) Inventor: Yuki Kurosaki, Yamato (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/525,052

(22) Filed: Nov. 30, 2023

(65) Prior Publication Data

US 2024/0240710 A1 Jul. 18, 2024

(30) Foreign Application Priority Data

Jan. 18, 2023 (JP) ................................. 2023-006037

(51) Int. Cl.
*F16H 57/04* (2010.01)
*F16H 48/08* (2006.01)

(52) U.S. Cl.
CPC ... *F16H 57/0426* (2013.01); *F16H 2048/082* (2013.01); *F16H 57/0483* (2013.01)

(58) Field of Classification Search
CPC ............. F16H 57/0426; F16H 57/0483; F16H 2048/082; F16H 57/0424
USPC .......................................... 475/160; 184/6.12
See application file for complete search history.

(56) References Cited

U.S. PATENT DOCUMENTS

| | | | |
|---|---|---|---|
| 5,643,127 A | 7/1997 | Yoshii et al. | |
| 7,025,702 B2 * | 4/2006 | Saito | F16H 57/0483 475/160 |
| 2017/0067550 A1 * | 3/2017 | Mummigatti | F16H 48/08 |
| 2022/0349464 A1 * | 11/2022 | Fukasawa | F16H 57/0483 |

FOREIGN PATENT DOCUMENTS

| | | | | |
|---|---|---|---|---|
| JP | H09296857 A | * | 11/1997 | ......... F16H 57/0483 |
| JP | 3287972 B2 | | 3/2002 | |

OTHER PUBLICATIONS

English translation of JPH09296857A; http://translationportal.epo.org; Apr. 23, 2024 (Year: 2024).*

* cited by examiner

*Primary Examiner* — Roger L Pang
(74) *Attorney, Agent, or Firm* — Sughrue Mion, PLLC

(57) ABSTRACT

A differential device includes: a pinion gear; a pinion shaft for rotatably supporting the pinion gear; a pair of side gears, which engage with the pinion gear and are fitted to a pair of drive shafts; a differential case, which supports the pinion shaft, houses the pinion gear and the side gears, and has an opening on one side of the drive shafts; and a differential cover, which has a hole through which one of the drive shafts penetrates, is fixed to the differential case, and closes the opening. Further, the differential cover has an oil passage which penetrates along the hole from an inner surface facing the side gears to an outer surface opposite to the differential case and through which a lubricating oil flows.

4 Claims, 5 Drawing Sheets

DIFFERENTIAL DEVICE

CROSS-REFERENCE TO RELATED APPLICATION(S)

The present application claims priority to and incorporates by reference the entire contents of Japanese Patent Application No. 2023-006037 filed in Japan on Jan. 18, 2023.

BACKGROUND

The present disclosure relates to a differential device.

U.S. Pat. No. 3,287,972 discloses a power transmission device for transmitting the rotation of the electric motor to the drive wheel. This power transmission device has a structure in which a differential case and a differential cover integrally cover the gear of the differential mechanism. The differential cover penetrates from the outer peripheral surface of the differential cover to the inner peripheral surface, and has a hole through which the oil flows. The oil supplied from the oil pump to the hole of the differential cover through the housing on the outer peripheral surface side of the differential cover is supplied into the differential case through between the inner peripheral surface of the differential cover and the output shaft.

SUMMARY

There is a need for supplying a lubricating oil to the inside of the differential device while suppressing the increase of the volumes of the cover and the housing.

According an embodiment, a differential device includes: a pinion gear; a pinion shaft for rotatably supporting the pinion gear; a pair of side gears, which engage with the pinion gear and are fitted to a pair of drive shafts; a differential case, which supports the pinion shaft, houses the pinion gear and the side gears, and has an opening on one side of the drive shafts; and a differential cover, which has a hole through which one of the drive shafts penetrates, is fixed to the differential case, and closes the opening. Further, the differential cover has an oil passage which penetrates along the hole from an inner surface facing the side gears to an outer surface opposite to the differential case and through which a lubricating oil flows.

DETAILED DESCRIPTION

Figure 1:
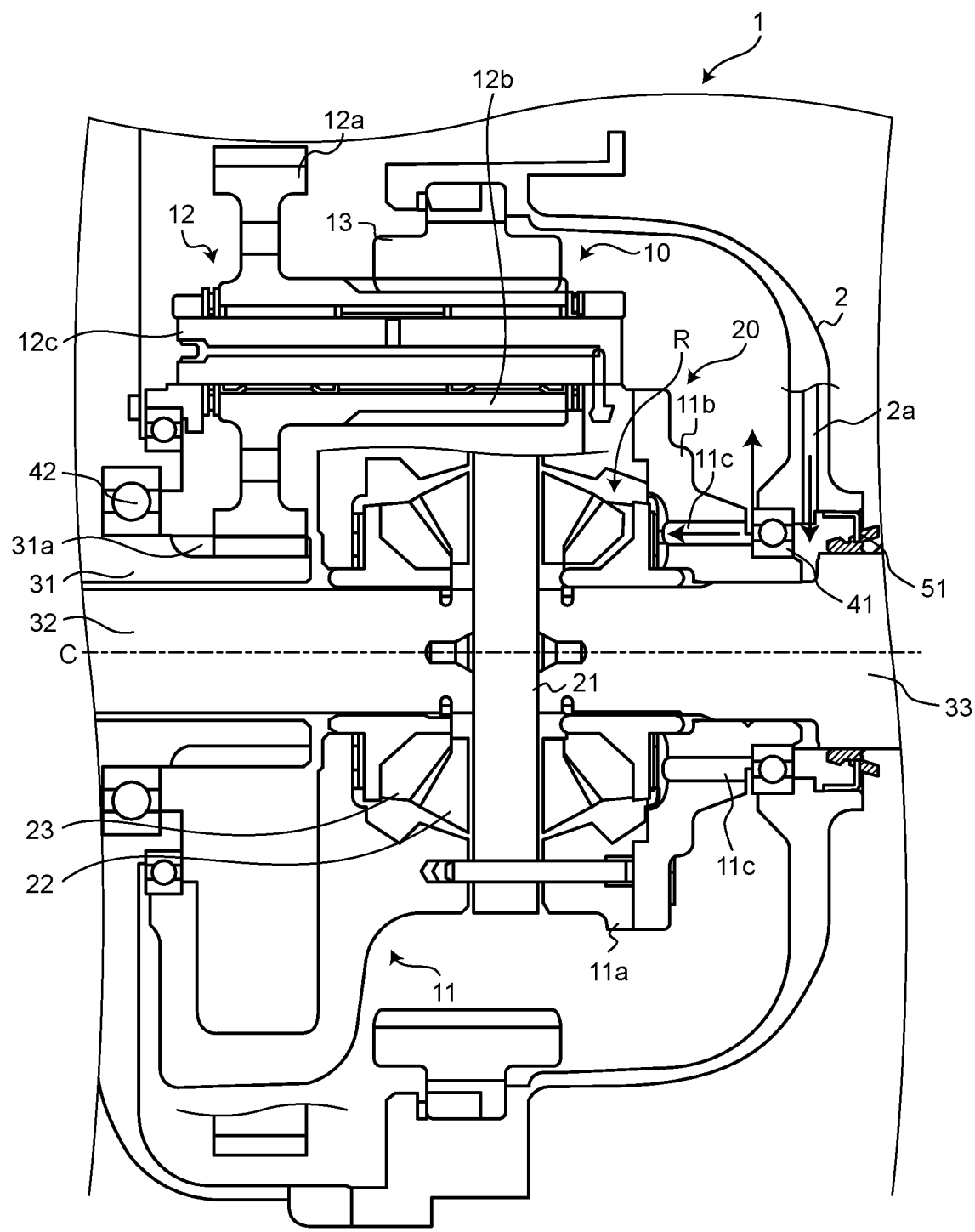
FIG. 1 is a cross-sectional view schematically illustrating a structure of a power transmission device 1 according to an embodiment.

In the disclosure in U.S. Pat. No. 3,287,972, it is necessary to provide a seal ring between the housing and the outer peripheral surface of the differential cover in order to prevent the oil supplied to the hole provided in the differential cover from leaking. However, by providing the seal ring, the differential cover to rotate is slid with respect to the seal ring, a loss occurs resistance due to sliding. Further, it is necessary to secure a space for providing the seal ring, the increase in volume in the output axis direction, an increase in machining cost for securing space occurs.

Hereinafter, the embodiment of the present disclosure is described in detail with reference to the drawings. Note that the present disclosure is not limited by the embodiments described below. Further, in the description of the drawings, the same or corresponding elements are appropriately denoted by the same reference numerals. In addition, it should be noted that the drawings are schematic and the relationship between the dimensions of each element, etc., may be different from the actual ones. In some cases, the drawings may contain parts in which the relationship or ratio of the dimensions is different from each other.

FIG. 1 is a cross-sectional view schematically illustrating the structure of the power transmission device 1 according to an embodiment of the present disclosure. The power transmission device 1 is for an electric vehicle. The power transmission device 1 has a planetary gear type reduction mechanism 10 arranged concentrically with the center line C, and a bevel gear type differential device 20. The reduction gear mechanism 10 and the differential device 20 are housed inside a housing 2.

On the left side of the reduction mechanism 10, an electric motor (not shown) is disposed. The electric motor includes a cylindrical output shaft 31. The electric motor is driven by a drive current supplied from the inverter to rotate the output shaft 31. At the end of the output shaft 31, a sun gear 31a is formed. The rotation of the output shaft 31 is decelerated by the reduction mechanism 10 engaged with the sun gear 31a, the decelerated rotation is transmitted to the pair of drive shafts 32 and 33 through the differential device 20.

The speed reduction mechanism 10 includes a carrier 11, a composite planetary gear 12, and a ring gear 13. The carrier 11 is rotatably disposed about the center line C. The carrier 11, a plurality of composite planetary gears 12 are rotatably disposed at equal angular intervals around the axis substantially parallel to the center line C. The composite planetary gear 12 includes a large-diameter pinion 12a and a small-diameter pinion 12b integrally axially, and is rotatable about an axis substantially parallel to the center line C through the planetary shaft 12c. The large diameter pinion 12a is engaged with the sun gear 31a formed on the output shaft 31. The ring gear 13 is fixed to the housing 2 and is engaged with the small-diameter pinion 12b. By the output shaft 31 and the sun gear 31a are rotationally driven, the carrier 11 is decelerated and rotated at a predetermined gear ratio using the ring gear 13 as a reaction element. Each gear of the reduction mechanism 10 is a helical gear whose meshing teeth are twisted.

Further, the carrier 11 is integrally provided with a differential case 11a on the small-diameter pinion 12b, so as to constitute a differential case portion of the differential device 20. A differential cover 11b is attached to the opening portion of the differential case 11a so as to close the opening. By the differential cover 11b to the opening of the differential case 11a is integrated attached, the differential chamber R differential pinion gear 22 and the differential side gear 23 is accommodated is formed. In the carrier 11, while the differential cover 11b is integrated, both end portions of the left and right are rotatably and axially supported by the housing 2 around the center line C through a pair of bearings 41 and 42.

The differential device 20 is disposed close to the reduction gear 10 on the small diameter pinion 12b of the compound planetary gear 12. The differential device 20 includes a differential pinion shaft 21, a differential pinion gear 22, and a differential side gear 23. The differential pinion shaft 21 is supported by the differential case 11a, it is arranged so as to be perpendicular to the center line C. The differential pinion shaft 21 is an example of a pinion shaft according to the present disclosure. The differential pinion gear 22 and the differential side gear 23 are bevel gears. The differential pinion gear 22, the differential pinion shaft 21 is passed through, is rotatably supported by the differential pinion shaft 21. The differential pinion gear is an example of a pinion gear according to the present disclosure. The differential side gear 23 is spline-fitted to the pair of drive shafts 32 and 33 so as not to rotate relative to each other, and is engaged with the differential pinion gear 22. The differential side gear 23 is an example of a side gear according to the present disclosure.

Figure 2:
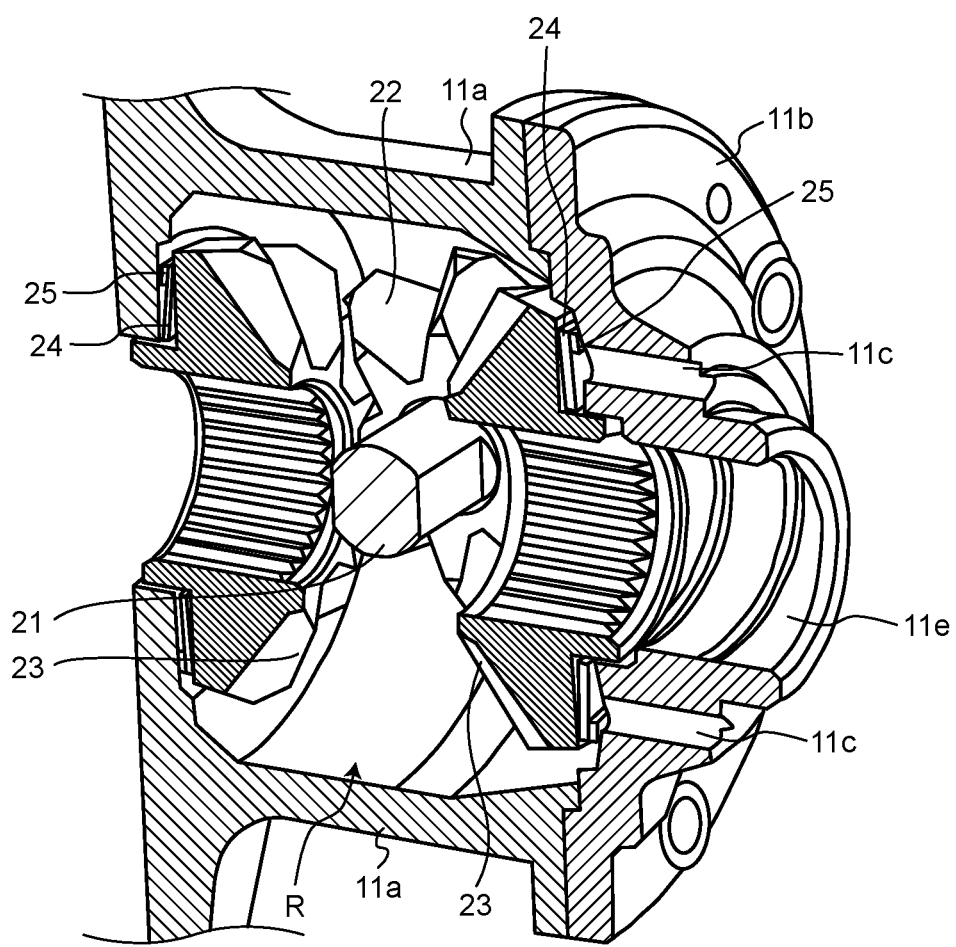
FIG. 2 is a perspective view of a cross-section of a differential device.

FIG. 2 is a perspective view of a cross section of the differential device 20. Between the differential side gear 23 and the differential cover 11b, shims 24 and dish springs 25 are disposed. Further, also between the differential case 11a and the differential side gear 23 of the electric motor, the shim 24 and the disk spring 25 is disposed. A load is applied to the differential side gear 23 as a preload by the shim 24 and the disk spring 25. Returning to FIG. 1, a pair of drive shafts 32, 33 are arranged concentrically with the centerline C. The drive shaft 32 extends through a cylindrical output shaft 31 in a relatively rotatable manner to the opposite side of the motor. The drive shaft 33 protrudes to the outside of the housing 2 through a hole 11e formed in the differential cover 11b. Drive wheels are connected to the drive shafts 32 and 33, and rotate of the drive shafts 32 and 33 is transmitted to the drive wheels. An oil seal 51 is provided between the drive shaft 33 and the housing 2 to prevent oil from flowing out.

Figure 3:
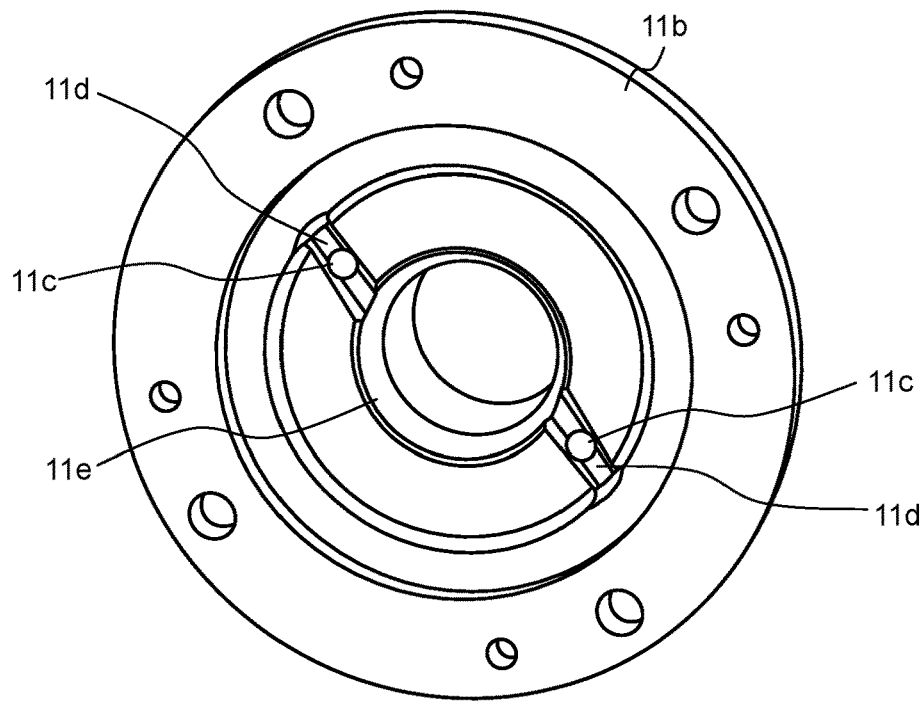
FIG. 3 is a perspective view of a differential cover viewed from an inner surface side thereof.

In the present embodiment, in order to prevent a seizure of the differential pinion gear 22 and the differential side gear 23 of the differential device 20, the oil passage 11c is formed in the differential cover 11b. An oil path 11c having a circular cross-sectional hole provided along the center line of the hole 11e, the cross-section thereof penetrating from the outer surface opposite the differential case 11a to the inner surface of the differential case 11a. Further, in the differential cover 11b, the oil passage for preventing seizure is formed on the inner surface facing the differential side gear 23. FIG. 3 is a perspective view of the differential cover 11b viewed from the inner surface. On the inner surface of the differential cover 11b, the opening of the oil passage 11c is located at the position of the oil groove 11d. The oil groove 11d is a groove of a predetermined depth formed toward the outer radially of the differential cover 11b from the opening of the hole 11e in the inner surface of the differential cover 11b. The oil groove 11d is a groove for supplying oil to the shim 24 and the disk spring 25 and allowing oil to flow to the outer periphery of the differential side gear 23.

As illustrated in FIG. 1, an oil passage 2a in which oil as a lubricating oil is supplied from an oil pump (not shown) is formed in the housing 2. The oil flowing through the oil passage 2a in the direction of the arrow in the drawing is supplied to the space between the bearing 41 and the oil seal 51. The oil supplied to the space between the bearing 41 and the oil seal 51 passes through the bearing 41, through the oil passage 11c in the vicinity of the bearing 41 in the direction of the arrow in the drawing, and through the oil groove 11d to the differential chamber R. Incidentally, the oil passing through the bearing 41 is also supplied to the space between the differential device 20 and the housing 2 through between the bearing 41 and the differential cover 11b in the orientation of the arrow in the drawing.

Figure 4:
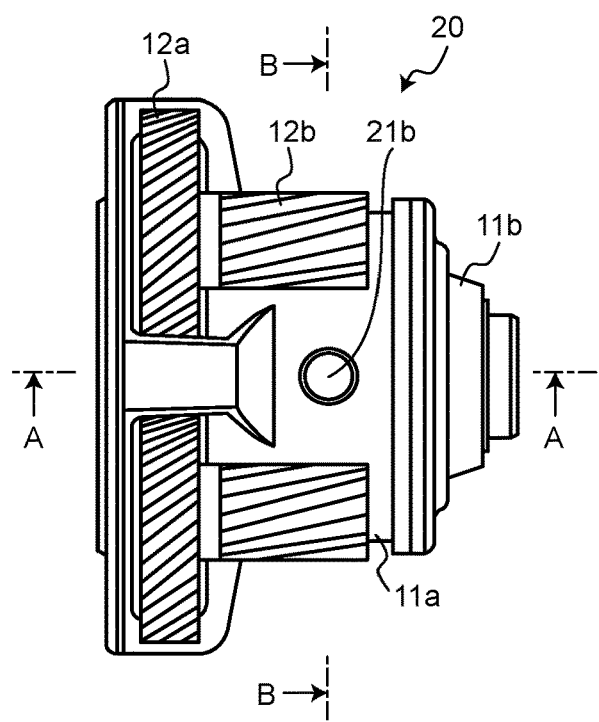
FIG. 4 is a plan view of the differential device.
Figure 5A:
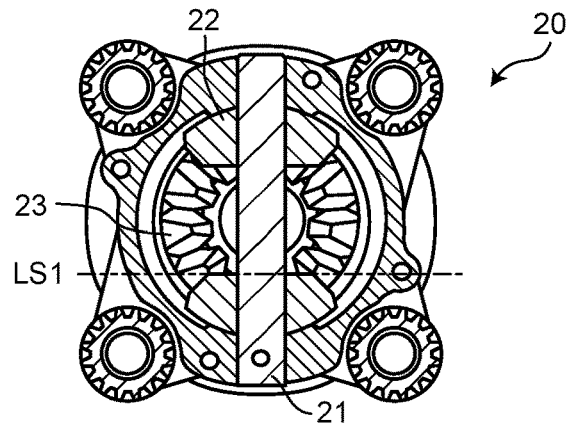
FIG. 5A is a sectional view taken along a line A-A of FIG. 4.
Figure 5B:
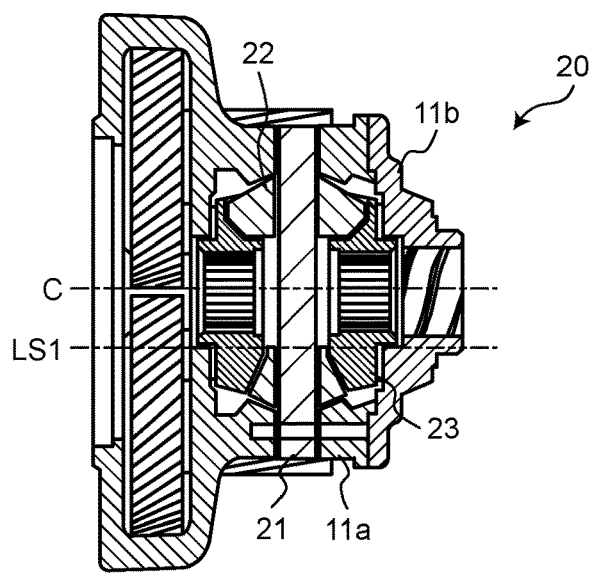
FIG. 5B is a sectional view taken along a line B-B of FIG. 4.
Figure 5C:
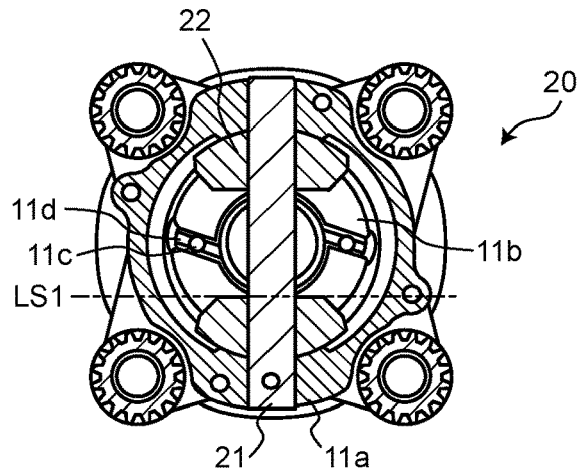
FIG. 5C is a diagram in which a differential side gear is omitted in FIG. 5A.

Next, the operation and effect of the present embodiment are described. FIG. 4 is a plan view of the differential device 20. Further, FIG. 5A is a A-A line cross-sectional view of FIG. 4, FIG. 5B is a B-B line cross-sectional view of FIG. 4. Further, FIG. 5C is a diagram in which an illustration of the differential side gear 23 is omitted from the diagram 5A. As illustrated in FIG. 5C, when the differential cover 11b is viewed from the inner surface side, when the differential pinion shaft 21 becomes perpendicular, the position of the oil passage 11c becomes a position of 0 degrees and 180 degrees around the rotation center, and the phase difference between the rotation of the differential pinion shaft 21 and the rotation of the oil passage 11C is shifted by 90 degrees around the center line C.

If the differential shaft 21 is vertically positioned and the differential device 20 stops, the oil passage 11c becomes a position higher than the lower differential side gear 23 as illustrated in FIG. 5C, inside the differential chamber R, the liquid level of the oil supplied to the differential chamber R is illustrated in FIGS. 5A and 5B, and the position of the two-dot chain line LS1 shown in FIG. 5C. When the differential device 20 is stopped when the differential pinion shaft 21 is upright and the oil supply to the differential chamber R is stopped, a small amount of oil leaks from the clearance between the differential pinion shaft 21 and the differential case 11a. However, in the present embodiment, the position of the liquid level of the oil when the differential device 20 is stopped is the position of the two-dot chain line LS1 illustrated in the figure, since the quantity of oil when stopped is increased, the differential chamber it is possible to lengthen the duration to hold the oil inside the R during stopping. Then, even if the differential device 20 is operated from a state of being stopped for a long time, since the oil is held for a long time in the differential chamber R, it is possible to prevent seizure of the differential pinion gear 22 and the differential side gear 23.

Figure 6A:
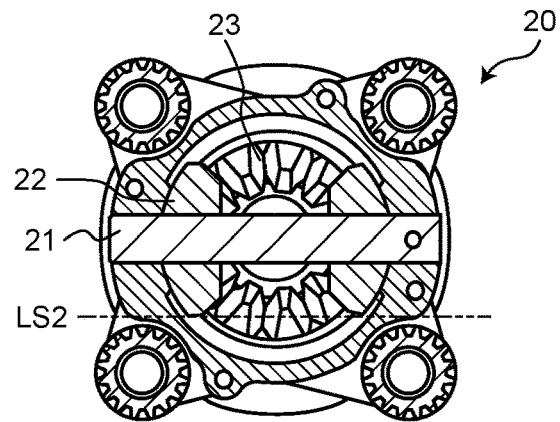
FIG. 6A is a cross-sectional view illustrating a state in which the differential device is rotated by 90 degrees from the state of FIG. 5A.
Figure 6B:
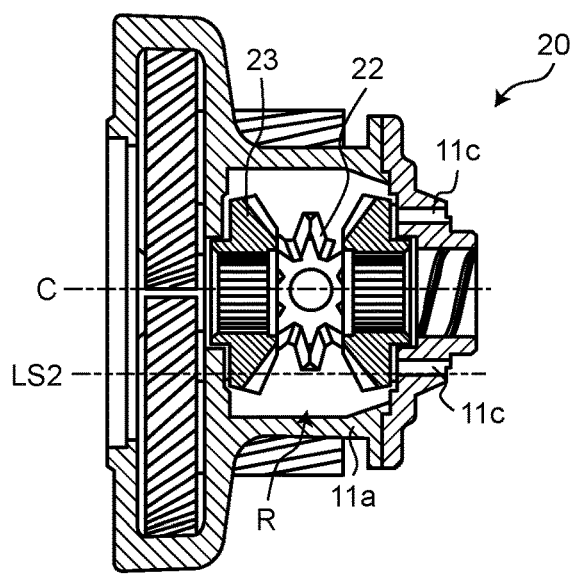
FIG. 6B is a cross-sectional view illustrating a state in which the differential device is rotated by 90 degrees from the state of FIG. 5B.

Next, FIG. 6A is a diagram illustrating a cross section when the differential device 20 is rotated by 90 degrees from the state illustrated in FIG. 5A, FIG. 6B is a diagram illustrating a state when the differential device 20 is rotated by 90 degrees from the state illustrated in FIG. 5B. Further, FIG. 6C is a diagram in which an illustration of the differential side gear 23 is omitted from FIG. 6A.

Figure 6C:
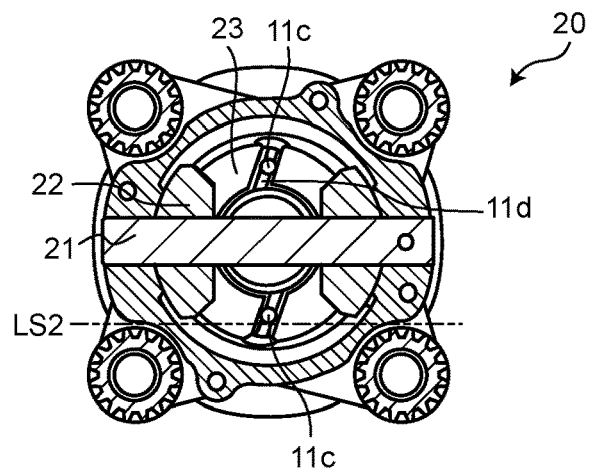
FIG. 6C is a diagram in which the differential side gear is omitted in FIG. 6A.

If the differential shaft 21 is positioned horizontally and the differential device 20 stops, one of the oil path 11c, as illustrated in FIG. 6C, becomes a lower position than the differential pinion shaft 21, in the differential chamber R inside, the oil level supplied to the differential chamber R in accordance with the position of the oil path 11c in FIGS. 6A and 6B, and the position of the two-dot chain line LS2 illustrated in FIG. 6C. With the differential device 20 stopped when the differential pinion shaft 21 is in horizontal and the supply of oil to the differential chamber R is stopped, the height of the liquid level of the oil is lowered than when the differential pinion shaft 21 is vertical. However, since the differential pinion shaft 21 is above the two-dot chain line LS2 and no oil leaks from the clearance between the differential pinion shaft 21 and the differential case 11a, it is possible to retain the oil in the differential chamber R even during stopping. Then, since the oil does not leak from the differential chamber R, it is possible to prevent seizure of the differential pinion gear 22 and the differential side gear 23 in the oil in the differential chamber R even if operated from a state of being stopped for a long period of time. Further, as illustrated in FIGS. 6A and 6B, when the differential pinion shaft 21 is leveled, since the differential pinion gear 22 is not immersed in the oil, it is possible to hold a large amount of oil in the differential chamber R.

Further, according to an embodiment, since the oil passage 11c along the hole 11e through which the drive shaft 33 is provided, the seal ring on the outer peripheral surface of the differential cover 11b is not required, the axial volume of the drive shaft 33 is prevented from increasing, machining of space-securing for the seal ring is not required. Further, according to an embodiment, since the opening of the oil passage 11b is located at the position of the oil groove 11d provided on the inner surface of the differential cover 11b, the path of the oil is ensured on the inner surface of the differential cover 11c, efficiently supplying oil to the differential chamber R. Further, when compared with the configuration in which the opening of the oil passage 11c at the position of the oil groove 11d is not located, it is possible to suppress the cost of processing.

While embodiments of the present disclosure have been described above, the present disclosure is not limited to the above-described embodiments, and can be implemented in various other forms. For example, the above-described embodiments may be modified as follows to implement the present disclosure. Incidentally, the embodiments described above and the following modifications may be combined each other. The components configured by appropriately combining the components of the embodiments and modifications described above are also included in the present disclosure. Further effects and variations can also be readily derived by those skilled in the art. Therefore, the wider aspect of the present disclosure is not limited to the above embodiments and modifications, and various modifications can be made.

In the above-described embodiment, there are two oil passage 11c, and the phase difference between the rotation of the differential pinion shaft 21 and the rotation of the oil passage 11C around the center line C is 90 degrees. However, the phase difference is not limited to 90 degrees. The lower end of the lower oil passage 11c above the upper end of the lower differential pinion gear 22 in the state illustrated in FIG. 5C where the differential pinion shaft 21 is perpendicular may be a phase differential located. If this phase differential exists, the liquid level of the oil can be made to be the same as the height shown in FIG. 5C.

In the above-described embodiment, the number of oil passage 11c formed on the differential cover 11b is two, but three or more oil passage 11c may be formed. If the number of the oil passage 11c is 3 or more, when viewed differential device 20 in the direction of the center line C, the oil passage 11c between the lower end and the upper end of the lower differential pinion gear 22 of the upper differential pinion gear 22 in a state shown in 5C in which the differential pinion shaft 21 is perpendicular to form an oil passage 11c so as to, preferably the phase difference between the rotation of the rotation and the oil passage 11C of the differential pinion shaft 21 differs.

In the differential device according to the present disclosure, an effect can be obtained that it is possible to supply the lubricating oil to the inside of the differential by suppressing the volume increase of the cover and the housing.

According to an embodiment, it is possible to supply the lubricating oil to the inside of the differential device by suppressing the volume increase of the pinion shaft, the pinion gear, and the cover and the housing of the side gear.

According to an embodiment, it is possible to retain many lubricating oil inside the differential device, and prevent seizure even if operated from a state of being stopped for a long period of time.

According to an embodiment, it is possible to supply the lubricating oil efficiently to the inside of the differential device.

What is claimed is:

1. A differential device comprising:
   a pinion gear;
   a pinion shaft for rotatably supporting the pinion gear;
   a pair of side gears, which engage with the pinion gear and are fitted to a pair of drive shafts;
   a differential case, which supports the pinion shaft, houses the pinion gear and the side gears, and has an opening on one side of the drive shafts; and
   a differential cover, which has a first hole through which one of the drive shafts penetrates, is fixed to the differential case, and closes the opening, wherein
   the differential cover has an oil passage which penetrates along the first hole from an inner surface facing the side gears to an outer surface opposite to the differential case and through which a lubricating oil flows,
   a phase of a second hole supporting the pinion shaft differs from a phase of the oil passage by 90 degrees in a rotation direction of the differential case,
   the differential cover has an oil groove in which the lubricating oil flows at a position facing a side gear on an inner surface side of the differential cover, and
   an opening of the oil passage is located at a position of the oil groove.

2. The differential device according to claim 1, wherein the differential device is configured such that, when the differential device is stopped and the pinion shaft is vertically positioned, a liquid level of oil in a chamber of the differential device is:
   perpendicular to the pinion shaft,
   below a base of the first hole, and
   corresponds to an upper end of a lower pinion gear.

3. The differential device according to claim 2, wherein the differential device is configured such that, when the differential device is stopped and the pinion shaft is horizontally positioned, the liquid level of the oil in the chamber is:
   parallel to the pinion shaft,
   below the base of the first hole, and
   corresponds to a base of an opening of a bottom oil passage.

4. The differential device according to claim 3, wherein the differential device does not include a seal ring on an outer peripheral surface of the differential cover.

* * * * *